(12) United States Patent
Kozawa et al.

(10) Patent No.: US 8,810,172 B2
(45) Date of Patent: Aug. 19, 2014

(54) MOTOR CONTROL APPARATUS, VALVE TIMING REGULATING APPARATUS AND INVERTER CIRCUIT ENERGIZATION METHOD

(75) Inventors: Takaharu Kozawa, Kariya (JP); Seiji Morino, Nagoya (JP)

(73) Assignee: Denso Corporation, Kariya (JP)

( * ) Notice: Subject to any disclaimer, the term of this patent is extended or adjusted under 35 U.S.C. 154(b) by 537 days.

(21) Appl. No.: 13/111,061

(22) Filed: May 19, 2011

(65) Prior Publication Data

US 2011/0290205 A1 Dec. 1, 2011

(30) Foreign Application Priority Data

May 31, 2010 (JP) ................................. 2010-124290

(51) Int. Cl.
*H02P 1/04* (2006.01)
*H02P 6/08* (2006.01)
(52) U.S. Cl.
CPC ...................................... *H02P 6/085* (2013.01)
USPC .................. 318/400.09; 318/400.01; 318/700
(58) Field of Classification Search
CPC ....................................................... H02P 6/085
USPC ................................. 318/400.09, 400.01, 700
See application file for complete search history.

(56) References Cited

U.S. PATENT DOCUMENTS

| | | | | |
|---|---|---|---|---|
| 4,961,042 | A * | 10/1990 | Imaseki | 318/758 |
| 5,119,007 | A * | 6/1992 | Tunehiro et al. | 318/801 |
| 5,563,980 | A * | 10/1996 | Chen et al. | 388/811 |
| 7,304,452 | B2 * | 12/2007 | Nagai et al. | 318/811 |
| 2004/0234402 | A1 | 11/2004 | Tani et al. | |
| 2009/0058344 | A1 | 3/2009 | Morino | |
| 2010/0283416 | A1 | 11/2010 | Onishi et al. | |

FOREIGN PATENT DOCUMENTS

| | | |
|---|---|---|
| JP | A-09-18313 | 1/1997 |
| JP | A-2004-112878 | 4/2004 |
| JP | A-2007-100564 | 4/2007 |
| JP | A-2009-141995 | 6/2009 |
| JP | A-2009-215274 | 9/2009 |

OTHER PUBLICATIONS

Office Action dated May 24, 2012 in corresponding JP Application No. 2010-124290 (and English translation).

* cited by examiner

*Primary Examiner* — David Luo
(74) *Attorney, Agent, or Firm* — Posz Law Group, PLC

(57) ABSTRACT

An energization control circuit compares a target rotation direction of a motor and an actual rotation direction of a motor detected based on rotation detection sensors. If the compared rotation directions are in disagreement, the energization control circuit switches over an inverter control mode from 120-degree energization to 180-degree energization to extend an on-period of a high-side switching element of an inverter circuit to an advance phase side. Thus, the high-side switching element is turned on, when a low-side switching element of the same phase is in a turned-off state. A free-wheeling current is allowed to flow through the high-side switching element rather than through a free-wheeling diode of the high-side switching element.

8 Claims, 14 Drawing Sheets

FIG. 5A
FORWARD TORQUE

| DETECTION SIGNAL LEVEL | | | | DRIVE SIGNAL LEVEL | | | | | | | | | | | |
|---|---|---|---|---|---|---|---|---|---|---|---|---|---|---|---|
| | | | | SAME DIRECTION | | | | | | DIFFERENT DIRECTION | | | | | |
| | | | | HIGH-SIDE | | | LOW-SIDE | | | HIGH-SIDE | | | LOW-SIDE | | |
| PATTERN | SU | SV | SW | FU | FV | FW | GU | GV | GW | FU | FV | FW | GU | GV | GW |
| i | L | H | L | H | L | L | L | P | L | H | L | L | L | P | L |
| ii | L | H | H | H | L | L | L | L | P | H | H | L | L | L | P |
| iii | L | L | H | L | H | L | P | L | L | L | H | L | P | L | L |
| iv | H | L | H | L | H | H | P | L | L | L | H | H | P | L | L |
| v | H | L | L | L | L | H | L | P | L | H | L | H | L | P | L |
| vi | H | H | L | H | L | H | L | L | P | L | L | H | L | L | P |

FIG. 5B
REVERSE TORQUE

| DETECTION SIGNAL LEVEL | | | | DRIVE SIGNAL LEVEL | | | | | | | | | | | |
|---|---|---|---|---|---|---|---|---|---|---|---|---|---|---|---|
| | | | | SAME DIRECTION | | | | | | DIFFERENT DIRECTION | | | | | |
| | | | | HIGH-SIDE | | | LOW-SIDE | | | HIGH-SIDE | | | LOW-SIDE | | |
| PATTERN | SU | SV | SW | FU | FV | FW | GU | GV | GW | FU | FV | FW | GU | GV | GW |
| i | L | H | L | L | H | L | L | L | P | L | H | L | L | L | P |
| ii | L | H | H | L | L | H | L | P | L | L | H | H | L | P | L |
| iii | L | L | H | L | L | H | P | L | L | H | L | H | P | L | L |
| iv | H | L | H | H | L | L | P | L | L | H | L | L | P | L | L |
| v | H | L | L | H | L | L | L | L | P | H | H | L | L | L | P |
| vi | H | H | L | L | H | L | L | P | L | L | H | L | L | P | L |

MOTOR CONTROL APPARATUS, VALVE TIMING REGULATING APPARATUS AND INVERTER CIRCUIT ENERGIZATION METHOD

CROSS REFERENCE TO RELATED APPLICATION

This application is based on and incorporates herein by reference Japanese Patent Application No. 2010-124290 filed on May 31, 2010.

FIELD OF THE INVENTION

The present invention relates to a motor control apparatus, which controls a motor by pulse-width modulation (PWM) through an inverter circuit configured by connecting switching elements having free-wheeling diodes in multi-phase bridge form. The present invention also relates to a valve timing regulating apparatus using the motor control apparatus and an energization method for an inverter circuit.

BACKGROUND OF THE INVENTION

In PWM-controlling a motor through an inverter, for example, a transistor (switching element) at one of a high side (arm) and a low side (arm) is turned on and a transistor of a different phase at the other of the high side and the low side is turned on and off repetitively. When a transistor is turned off, a coil of the motor generates a counter-electromotive force so that a free-wheeling current flows in a free-wheeling diode connected to the transistor, which is in the same phase but at the other side of such a turned-off transistor.

Since the forward direction voltage of a diode is generally about 0.7 V, loss arises in correspondence to a free-wheeling current when a free-wheeling current flows in a free-wheeling diode. Patent document 1, for example, discloses a technology to reduce loss in a diode by turning on a drive transistor at a high side at the same time as turning off a drive transistor at a low side in PWM-controlling a DC motor by a H-bridge circuit, thereby flowing a free-wheeling current to a drive transistor without passing through a free-wheeling diode. Patent document 2 discloses a technology to perform the similar control for each switching element of an inverter circuit, in PWM-controlling a three-phase motor by an inverter circuit in a three-phase bridge configuration.
(Patent document 1) JP H9-18313A
(Patent document 2) JP 2005-9480A (US 2004/0234402A1)

Motor control by an inverter circuit is also used in a valve timing regulating apparatus, which regulates a relative phase between a crankshaft and a camshaft of an internal combustion engine by applying control torque generated by a rotary shaft of a motor to a phase regulating mechanism and driving the camshaft to rotate in accordance with the control torque. According to this control, the motor sometimes rotates in a direction, which is different from the direction instructed by a control circuit in a course of fall of the rotation speed of the internal combustion engine. That is, such a situation arises until the motor actually starts to changes its direction of rotation, when the motor is instructed to rotate in reverse while the motor is rotating in the forward direction.

In this situation, the motor operates as a generator for a moment. As a result, a free-wheeling current, which is greater than that flowing under normal PWM control, flows in a free-wheeling diode of a switching element forming an inverter circuit. FIG. 14 shows in (a), for example, each phase current of U-phase, V-phase and W-phase when a target rotation direction and an actual rotation direction of a motor agree (normal rotation) in case that a three-phase motor is energized according to 120° (120-degree) energization method. FIG. 14 also shows high-side phase currents and low-side phase currents in (b) and (c), respectively. Each hatched part in (c) indicates a current, which flows when the PWM control is performed by switching the low side. Each hatched part in (b) indicates a current, which flows as a free-wheeling current in correspondence to such a current. Each non-hatched part, which appears at the end of the hatched part as shown in (b), indicates a free-wheeling current, which flows in the high-side when the PWM control for low-side switching elements is switched to stop.

FIG. 15, on the contrary to FIG. 14, shows a situation, when the target rotation direction and the actual rotation direction of the motor differ (opposite rotation). In this case, since the direction of rotation of the motor becomes opposite to an energization pattern in an inverter circuit, a phase current is distorted as shown in (a). A current, which free-wheels in the high-side, becomes greater than a current, which flows in the low-side as a result of switching control. A hatched part in (b) indicates, similarly to FIG. 14, a free-wheeling current, which flows in the low-side switching elements in a switching period. Thus, loss in the free-wheeling diode increases. Since a current (indicated by a solid line), which flows in correspondence to a counter-electromotive force generated in a coil of a motor, is added to a free-wheeling current flowing at this time as shown in FIG. 16, the loss in the diode further increases. FIG. 16 schematically shows each switching element of an inverter circuit and coils of a motor. This figure specifically shows a situation, in which a free-wheeling current (indicated by a one-dot chain line) flows through a fee-wheeling diode connected to a V-phase high-side switching element, when a V-phase low-side switching element (indicated by X) changes its state from ON to OFF at the time of switching over the V-phase low-side and the W-phase low-side by a PWM signal while the U-phase high-side is turned on. A current flowing in the W-phase low-side is shown by a broken line. A cross-hatched part in (b) of FIG. 15 correspond to a period, in which a free-wheeling current caused by the above-described induced voltage is superposed. Thus loss arises in the free-wheeling diode.

SUMMARY OF THE INVENTION

It is an object of the present invention to provide a motor control apparatus, which can reduce loss caused in a free-wheeling diode when an actual rotation direction of a motor becomes opposite to an instructed rotation direction, a valve timing regulating apparatus using the motor control apparatus and an energization control method for an inverter circuit.

According to one aspect of the present invention, a target rotation direction of a motor and an actual rotation direction of a motor detected based on rotation detection sensors are compared. If the compared rotation directions are in disagreement, an inverter control mode is switched from 120-degree energization to 180-degree energization to extend an on-period of a high-side switching element of an inverter circuit to an advance phase side. Thus, the high-side switching element is started to turn on, when a low-side switching element of the same phase as the high-side switching element is in a turned-off state. A free-wheeling current is allowed to flow through the high-side switching element rather than through a free-wheeling diode of the high-side switching element.

It is noted that under 120-degree energization, on-periods of the high-side switching element and the low-side switching element in the same phase do not overlap. However, when the energization is switched over from the 120-degree energization to 180-degree energization, it is possible that the on-periods of the high-side switching element and the low-side switching element of the same phase overlap. However, this on-period overlap is surely prevented by providing a dead time, that is, by advancing the on-period of the high-side switching element.

BRIEF DESCRIPTION OF THE DRAWINGS

The above and other objects, features and advantages of the present invention will become more apparent from the following detailed description made with reference to the accompanying drawings. In the drawings:

FIGS. 5A and 5B are tables showing logic of motor energization patterns in the embodiment;

DETAILED DESCRIPTION OF THE PREFERRED EMBODIMENT

The present invention will be described with reference to one embodiment shown in FIG. 1 to FIG. 13.

Figure 1:
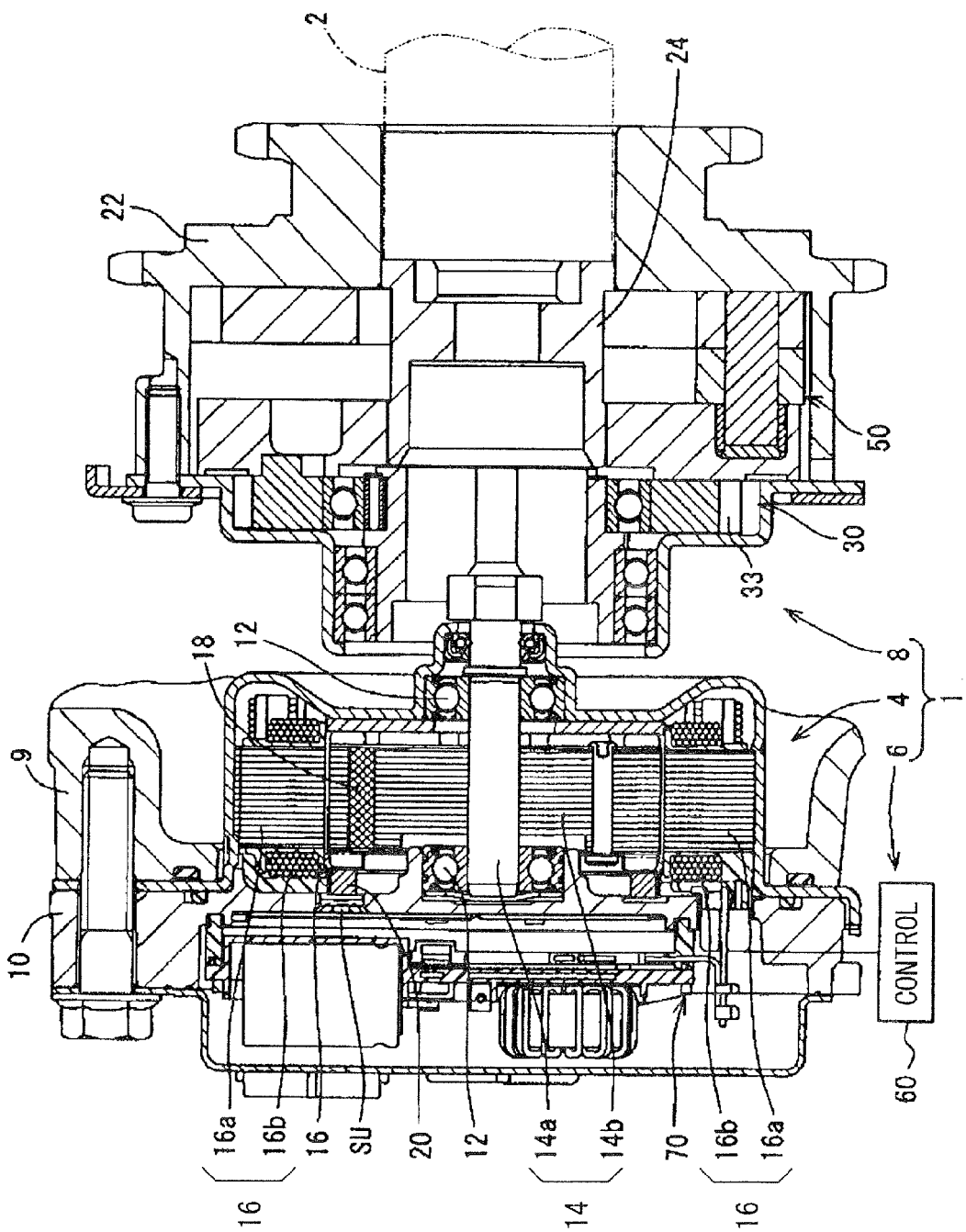
FIG. 1 is a longitudinal sectional view showing an electric valve timing regulating apparatus, which uses a motor control apparatus according to one embodiment of the present invention.

An electric valve timing regulating apparatus 1 according to this embodiment is shown in FIG. 1. The valve timing regulating apparatus 1 is mounted in a vehicle and particularly provided in a torque transmission system, which transmits engine torque from a crankshaft (not shown) to a camshaft 2 of an internal combustion engine (for example, gasoline engine or diesel engine). The valve timing regulating apparatus 1 is formed of a combination of a motor 4, an energization control unit (motor control apparatus) 6 and a phase regulating mechanism 8 to regulate valve timing, which is determined by an engine phase that is a relative phase between the crankshaft and the camshaft 2. The camshaft 2 is for opening and closing a suction valve (not shown) of the internal combustion engine and the valve timing regulating apparatus 1 adjusts the valve timing of the suction valve.

The motor 4 is a brushless DC motor of implanted permanent magnet (IPM) type, which has a housing 10, bearings 12, a rotary shaft 14, permanent magnets 18 and a stator 16. The housing 10 is firmly attached to a body part 9 of the internal combustion engine such as a chain case. Two bearings 12 and the stator 16 are accommodated within the housing 10. Each bearing supports an axial body 14a of the rotary shaft 14 to be rotatable in forward and reverse directions. A plurality of permanent magnets 18 are embedded inside a rotor part 14b, which protrudes from the axial body 14a in the radially outward direction in the rotary shaft 14. The permanent magnets 18 are arranged equi-angularly in a rotation direction. The permanent magnets 18 arranged adjacently in the rotation direction have magnetic poles, which are opposite to each other, and face an outer peripheral wall side of the rotor part 14b. The stator 16 is located coaxially at an outer side of the rotor part 14b and has cores 16a and coils 16b. The cores 16a are formed of stacks of iron pieces, and located at a plurality of positions spaced equi-angularly in the rotation direction of the rotary shaft 14. The coils 16b are wound about the cores 16a individually.

The energization control unit 6 is connected to each coil 16b of the motor 4 to control energization of the coil 16b in accordance with an operating condition of the internal combustion engine. In the motor 4, each coil 16b generates a rotating magnetic field, which exerts on each permanent magnet 18 when energized, and causes the rotor part 14b to generate torque in a direction corresponding to the generated magnetic field so that the rotary shaft 14 is rotated.

The phase regulating mechanism 8 has a driving-side rotor body 22, a driven-side rotor body 24, a planetary gear unit 30 and a coupling unit 50. The driving-side rotor body 22 is a timing sprocket, on which a timing chain is wound to be linked with the crankshaft of the internal combustion engine. When output torque of the crankshaft is applied to the driving-side rotor body 22, the driving-side rotor body 22 responds to the crankshaft and rotates in the forward direction while maintaining a relative phase with the crankshaft. The driven-side body 24 is fixed coaxially to the camshaft 24 of the internal combustion engine to rotate with the camshaft 2 in the forward direction. In this case, the forward direction and the reverse direction of the rotary shaft 14 are set to the same direction and the opposite direction of rotation of the internal combustion engine, respectively.

Figure 2:
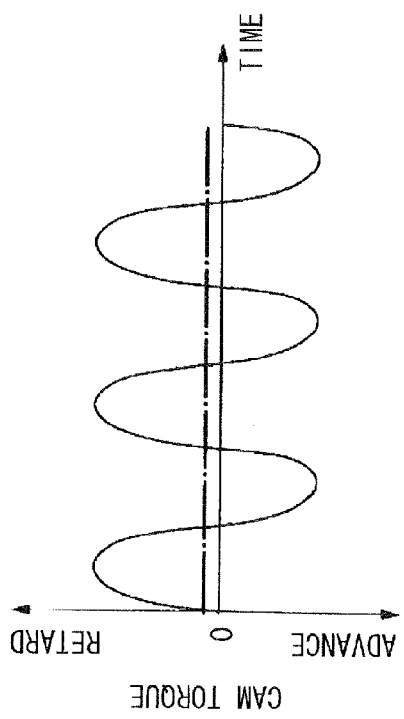
FIG. 2 is a timing diagram showing cam torque generated by a camshaft in the valve timing regulating apparatus shown in FIG. 1.

The mechanism 8 regulates the engine phase by driving the camshaft 2 to rotate, to which cam torque arising from reaction force of the suction valve is applied in an advance (lead) angle side and a retard (lag) angle side alternately as shown in FIG. 2, in accordance with control torque applied to the rotary shaft 14. Specifically, when the control torque is maintained so that the rotary shaft 14 does not make relative rotation against the driving-side rotor body 22, the planetary gear set 33 does not perform planetary motion and rotates with the driving-side rotor body 22 and a transmitting rotor body 34. As a result, the rotary shaft 14 and the camshaft 2 rotate together so that the relative phase between the driving-side rotor body 22 and the driven-side rotor body 22 and the engine phase, which determines the valve timing are maintained. When the rotary shaft 14 relatively rotates in the forward direction relative to the driving-side rotor body 22 due to increase in the control torque in the forward direction and the like, the transmitting rotor body 34 relatively rotates in the reverse rotation direction (counter-clockwise direction) relative to the driving-side rotor body 22 by the planetary motion of the planetary gear set 33. As a result, the camshaft 2 is driven to relatively rotate with the driven-side rotor body 22 in the forward direction (clockwise direction) relative to the driving-side rotor body 22 so that the engine phase is advanced.

When the rotary shaft 14 relatively rotates in the reverse direction relative to the driving-side rotor body 22 due to increase in the control torque in the reverse direction and the like, the camshaft 2 is driven to relatively rotate with the driven-side rotor body 24 in the reverse rotation direction relative to the driving-side rotor body 22 according to a principle opposite to that of the relative rotation in the forward direction so that the engine phase is retarded. The details of the foregoing configuration (sectional structure shown in FIG. 1) are conventional. The forward and reverse rotation directions (clockwise and counter-clockwise rotation directions) are also described with reference to such figures.

Figure 3:
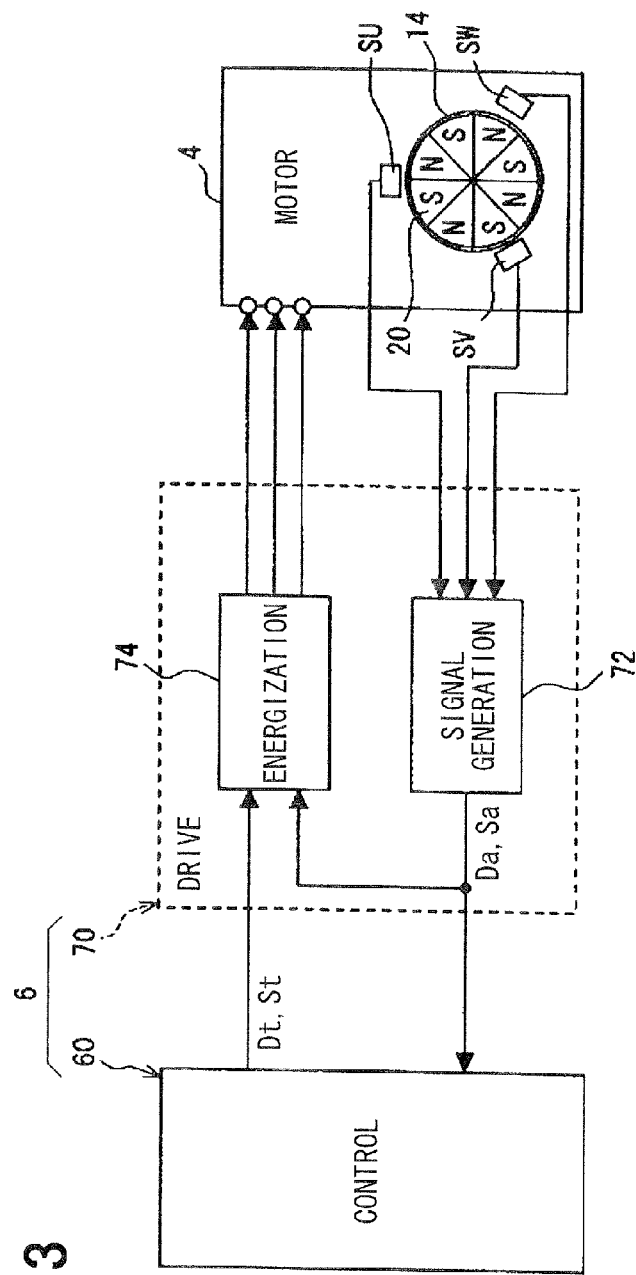
FIG. 3 is a block diagram showing configuration of the motor control apparatus according to the embodiment.

As shown in FIG. 3, the motor 4 has three rotation angle sensors (position sensors, rotation direction sensors) SU, SV and SW. Each rotation angle sensor SU, SV and SW is formed of a Hall element or the like and arranged in the circumferential direction, that is, in the direction of rotation of the rotary shaft 14, with a predetermined interval from adjacent elements. The rotation angle sensors SU, SV and SW detect magnetic field generated by a magnetic pole of a sensor magnet (position sensor, rotation direction sensor) 20 mounted on the rotary shaft 14 and output detection signals indicating an actual rotation position 8 of the rotary shaft 14. The rotation angle sensors SU, SV and SW turn on to set a voltage level of the detection signal high (H) when the N-pole of the sensor magnet 20 is located within respective detection ranges, and turn off to set the voltage level of the detection signal to low (L) when the S-pole of the sensor magnet 20 is located within respective detection ranges. The sensor signals outputted from the rotation angle sensors SU, SV and SW are referred to as SU, SV and SW hereunder.

The energization control unit 6 has a control circuit (control means) 60 and a drive circuit 70. The control circuit 60 is located outside the motor 4 and the drive circuit 70 is located inside the motor. However both of these circuits 60 and 70 may be located outside or inside the motor 4. The control circuit 60 is formed of a microcomputer as a main circuit component and connected to the drive circuit 70. The control circuit 60 has a function of controlling energization of the motor 4 as well as a function of controlling the internal combustion engine.

The control circuit 60 calculates an actual valve timing of the engine phase based on an actual rotation direction Da and actual rotation speed Sa of the motor 4 supplied from the drive circuit 70 and calculates a target valve timing based on operating conditions of the internal combustion engine. The control circuit 60 further sets a target rotation direction Dt and a target rotation speed St of the motor 4 based on a phase difference between the calculated actual valve timing and the target valve timing and outputs these set values to the drive circuit 70. The drive circuit 70 has a signal generation circuit 72 and an energization circuit 74. The blocks 72 and 74 are formed as hardware logic circuits.

The signal generation circuit 72 is connected to the rotation angle sensors SU, SV and SW of the motor 4, the control circuit 60 and the energization circuit 74. The signal generation circuit 72 calculates the actual rotation direction Da and the actual rotation speed Sa of the motor 4 based on the detection signals SU, SV and SW of the rotation angle sensors SU, SV and SW indicating the actual rotation position θ of the rotary shaft 14, and outputs the calculated values to the control circuit 60 and the energization circuit 74. The rotation direction Da is determined, for example, by predicting a next sensor pattern from present sensor patterns of SU, SV and SW. If the predicted pattern is a forward rotation pattern and a reverse rotation pattern, the directions are determined to be a forward rotation and a reverse rotation, respectively. The forward rotation and the reverse rotation are outputted as digital signals of high and low levels. The actual rotation speed is determined, for example, by counting an interval of edge outputs of the sensor signals SU, SV and SW by a counter.

Figure 4:
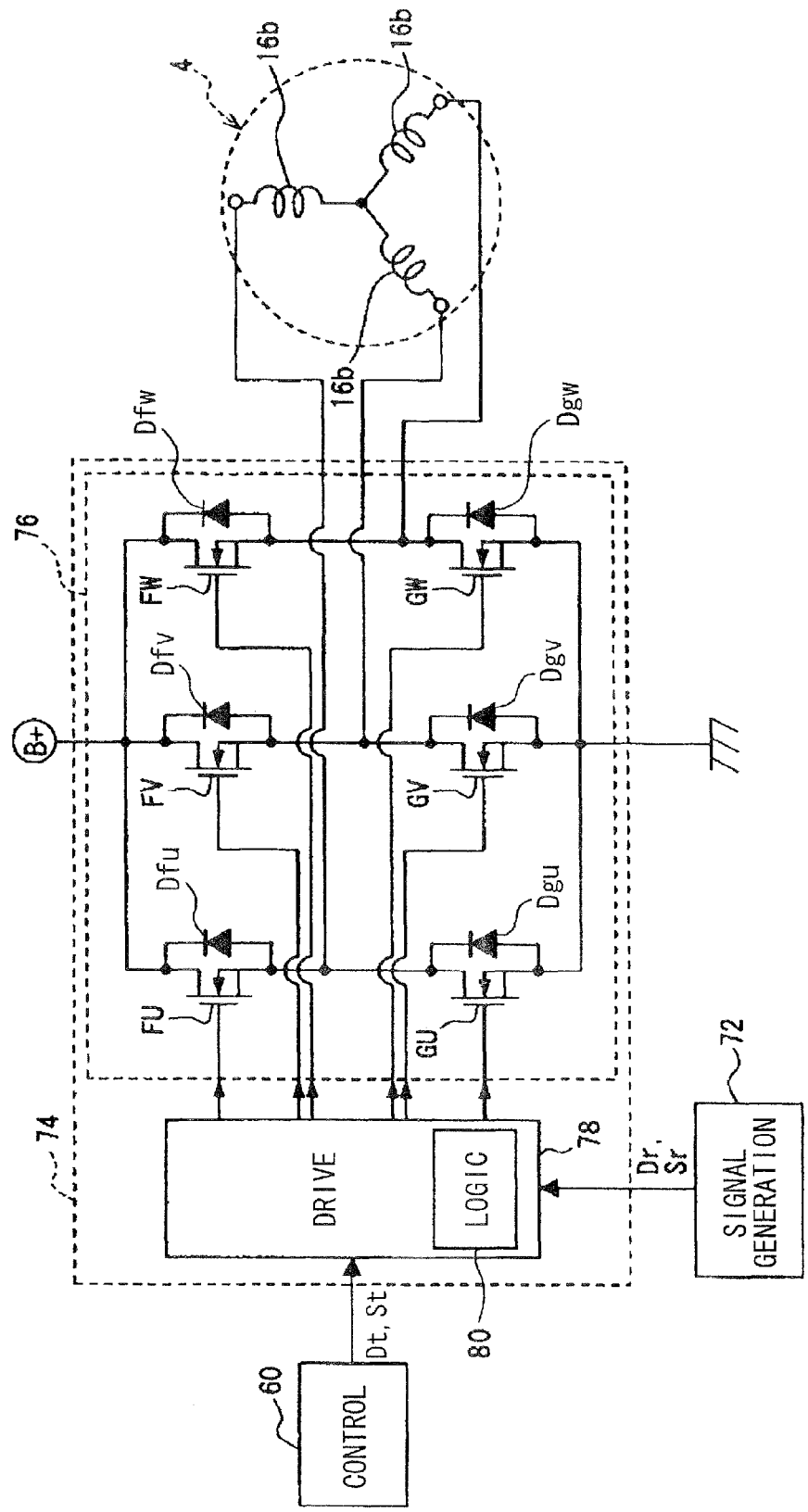
FIG. 4 is a circuit diagram showing detailed configuration of the motor control apparatus shown in FIG. 3.

As shown in FIG. 4, the energization circuit 74 has an inverter circuit 76 and an energization drive circuit 78. The inverter circuit 76 is a three-phase bridge circuit, which includes high-side switching elements FU, FV and FW and low-side switching elements GU, GV and GW. The high-side switching elements FU, FV and FW and low-side switching elements GU, GV and GW are all formed of, for example, N-channel power MOSFETs. A free-wheeling diode Dfu, Dfv, Dfw, Dgu, Dgv and Dgw of each element is formed of a parasitic diode. Sources of the high-side switching elements FU, FV and FW and drains of the low-side switching elements GU, GV and GW are connected to each other and connected to one ends of the phase coils 16b of the motor 4, respectively. The phase coils 16b are star-connected.

The energization drive circuit 78 is formed of a control IC and electrically connected to the control circuit 60, the signal generation circuit 72 and each switching element FU, FV, FW, GU, GV and GW of the inverter circuit 76. The energization drive circuit 78 controls on/off of each switching element FU, FV, FW, GU, GV and GW based on the target rotation direction Dt and the target rotation speed St supplied from the control circuit 60 as well as the actual rotation direction Da and the actual rotation speed Sa supplied from the signal generation circuit 72. The motor 4 is thus energized and generates output torque at the rotary shaft 14.

Here, the energization drive circuit 78 regulates the control torque by controlling patterns i to vi (hereinafter referred to as energization pattern) of a voltage level of the drive signals (gate signals) applied to switching elements FU, FV, FW, GU, GV and GW, as shown in FIGS. 5A and 5B. In FIGS. 5A and 5B, P indicates pulse-width modulation of a voltage level of a drive signal in each energization pattern i to vi. The drive signals applied to the switching elements FU, FV, FW, GU, GV and GW are indicated as FU, FV, FW, GU, GV and GW, respectively. Specifically, in case that both of the target and the actual rotation directions Dt and Da are both forward directions, the energization drive circuit 78 regulates the control torque, which is applied to the rotary shaft 14 rotating in the forward direction, by switching over the energization patterns i to vi as shown in FIG. 5A. In case that both of the target and the actual rotation directions Dt and Da are both reverse directions, the energization drive circuit 78 regulates the control torque, which is applied to the rotary shaft 14 rotating in the reverse direction, by switching over the energization patterns i to vi as shown in FIG. 5B.

Figure 6:
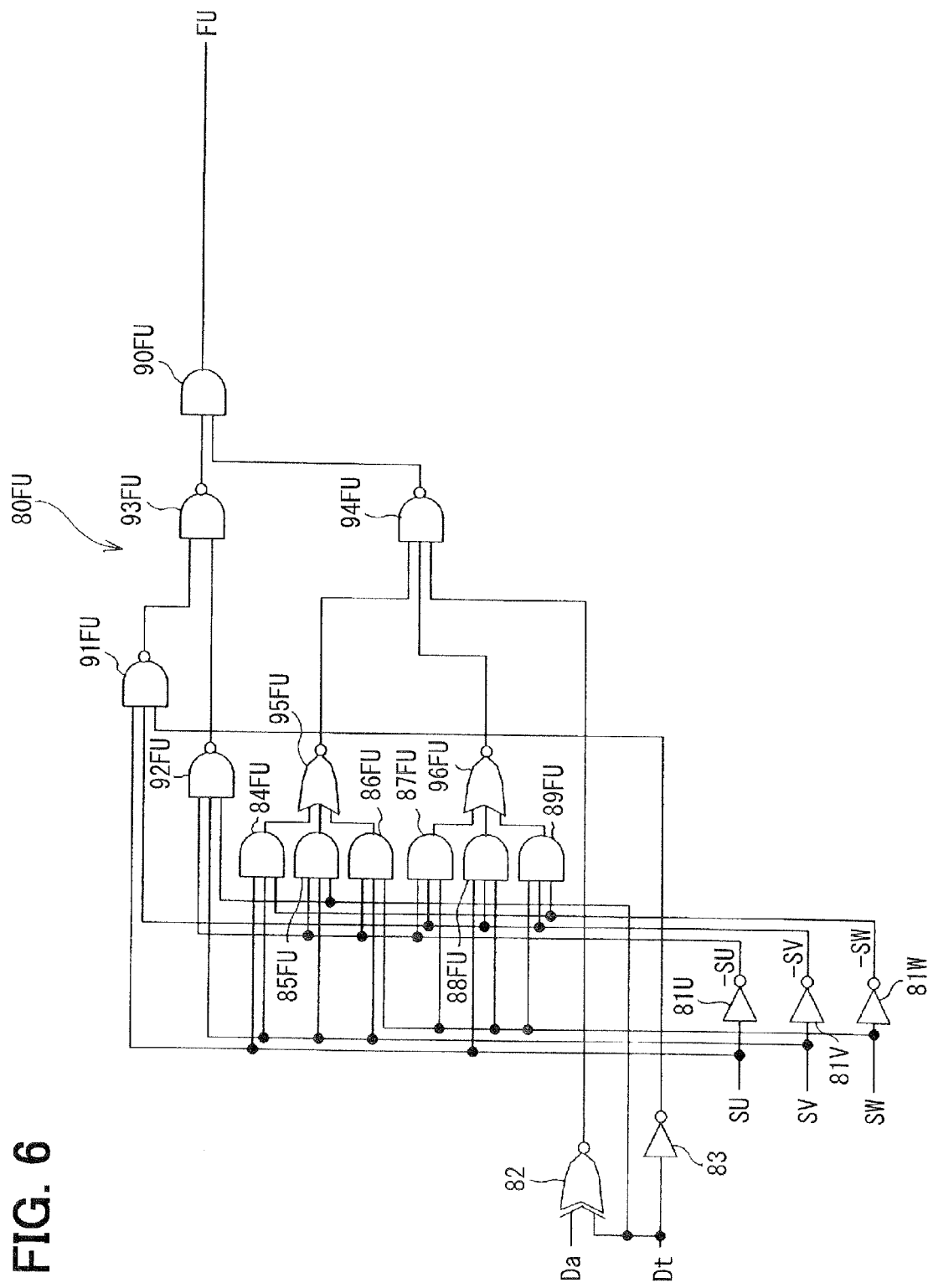
FIG. 6 is a circuit diagram (part 1) showing a motor energization control logic in the embodiment.

FIGS. 6 to 9 show an energization control logic circuit 80 provided in the energization drive circuit 78. FIG. 6 shows a logic part 80FU, which generates the drive signal FU. The sensor signals SU, SV and SW are applied to input terminals of NOT gates 81U, 81V and 81W, and NOT gates 81U, 81V and 81W output reverse signals −SU, −SV and −SW, which are inversion of SU, SV and SW, respectively.

The actual rotation direction Da and the target rotation direction Dt are applied to one and the other of input terminals of an EXNOR (exclusive-NOR) gate 82, respectively. The target rotation direction Dt is also applied to an input terminal of a NOT gate 83.

The logic part 80FU is formed of seven AND gates 84FU to 90FU, four NAND gates 91FU to 94FU and two NOR gates 95FU and 96FU. Of these gates, only the AND gate 90FU and the NAND gate 93FU has two input terminals and all the other gates have three input terminals. Output terminals of the AND gates 84FU to 86FU are connected to input terminals of the NOR gates 95FU. Output terminals of the AND gates 87FU to 89FU are connected to input terminals of the NOR gate 96FU.

The output terminals of the NAND gates 91FU and 92FU are connected to the input terminals of the NAND gate 93FU, respectively. The output terminals of the EXNOR gate 82, the NOR gate 95FU and 96FU are connected to the input terminals of the NAND gate 94FU. The output terminals of the NAND gate 93FU and 94FU are connected to the input terminals of the AND gate 90FU, respectively.

The sensor signals SU, SV and SW are applied to the input gates as follows. Here, the gates are denoted only by reference numerals (FV is omitted).
Sensor Signals: Gates Assigned to Input Terminals
SU: 84, 88, 91
SV: 84, 85, 86, 92
SW: 86, 87, 88, 89

The sensor signals −SU, −SV and −SW are applied to the input terminals of the gates as follows.
Sensor Signals: Gates Assigned to Input Terminals
−SU: 85, 86, 87, 92
−SV: 87, 88, 89, 91
−SW: 84, 89

The target rotation direction Dt is applied to the input terminals of the AND gate 85FU and the NAND gate 92FU. An inverted signal from the NOT gate 83 is applied to the input terminal of the NAND gate 91FU.

Figure 7:
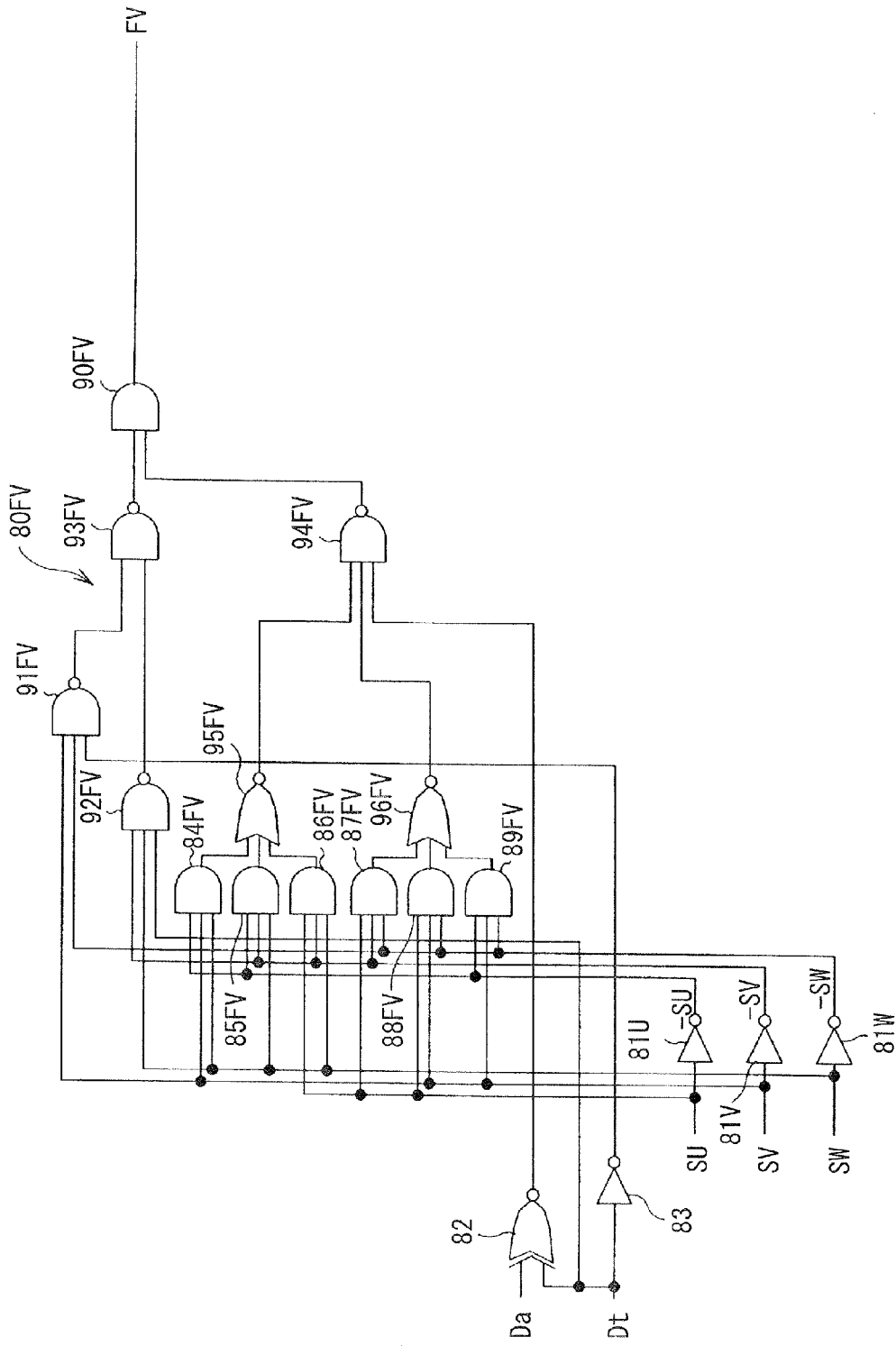
FIG. 7 is a circuit diagram (part 2), which corresponds to FIG. 6.

FIG. 7 shows a logic part 80FV, which generates a drive signal FV. It has the NOT gates 81, 83 and the EXNOR gate 82, which are common with the logic part 80FU, and similarly seven AND gates 83FV to 90FV, four NAND gates 91F to 94FV and two NOR gates 95FV, 96FV are provided. These are connected differently only in that the sensor signals SU, SV, SW and −SU, −SV, −SW are applied to the input terminals of the gates. The sensor signals SU, SV and SW are applied to the input terminals of the gates as follows. The gates are denoted by only reference numerals (FV is omitted).
Sensor Signals: Gates Assigned to Input Terminals
SU: 86, 87, 88
SV: 84, 88, 89, 91
SW: 84, 85, 86, 92

The sensor signals −SU, −SV and −SW are applied to the input terminals of the gates as follows.
Sensor Signals: Gates Assigned to Input Terminals
−SU: 84, 85, 89
−SV: 85, 86, 87, 92
−SW: 87, 88, 89, 91

Figure 8:
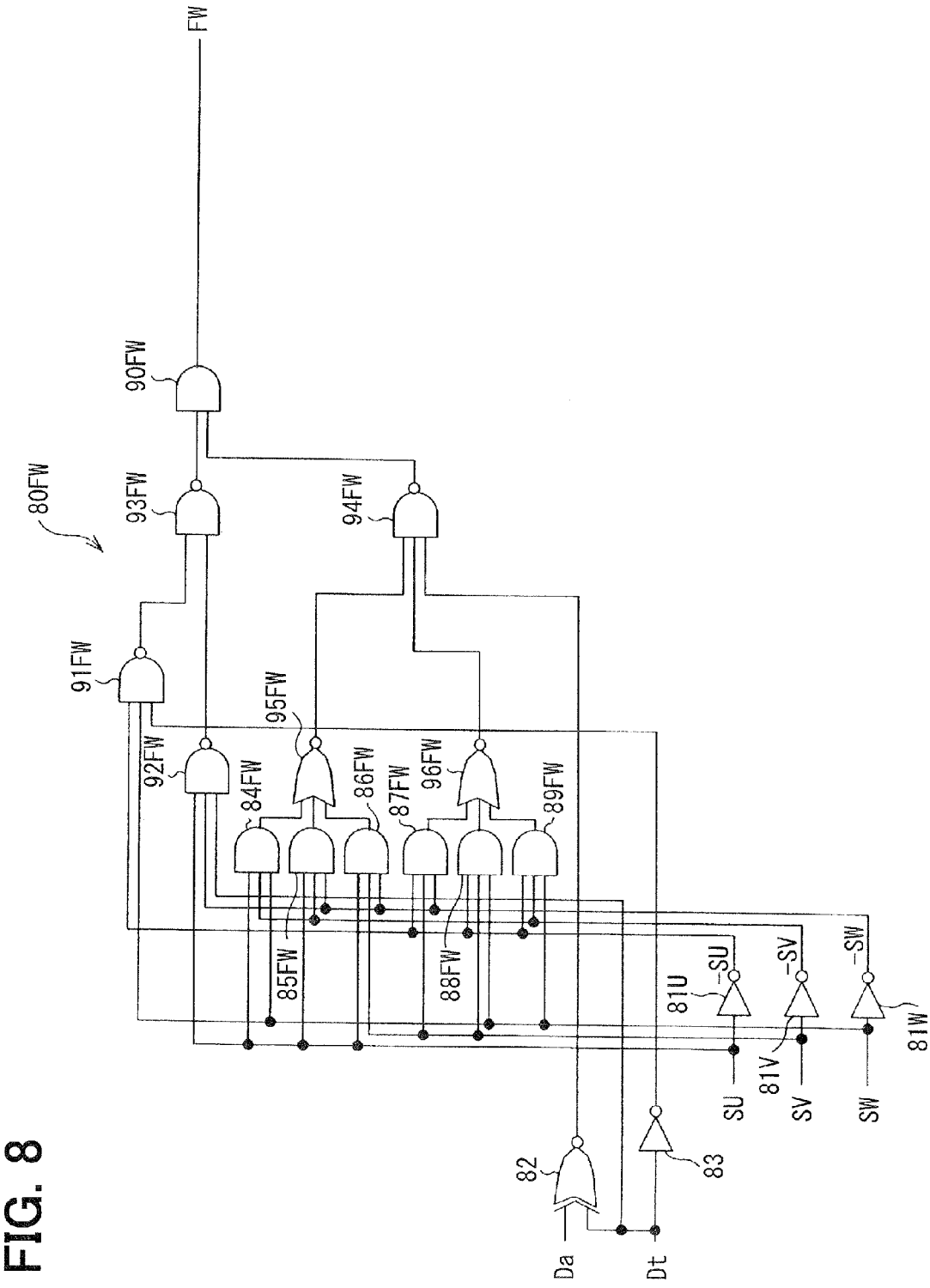
FIG. 8 is a circuit diagram (part 3), which corresponds to FIG. 6.

FIG. 8 shows a logic part 80FW, which generates a drive signal FW. Similarly to FIG. 7, FW is attached to reference numerals of the corresponding gates. The sensor signals SU, SV and SW are applied to the input terminals of the gates as follows. The gates are denoted by only reference numerals (FW is omitted).
Sensor Signals: Gates Assigned to Input Terminals
SU: 84, 85, 86, 92
SV: 86, 87, 88
SW: 84, 88, 89, 91

The sensor signals −SU, −SV and −SW are applied to the input terminals of the gates as follows.
Sensor Signals: Gates Assigned to Input Terminals
−SU: 87, 88, 89, 91
−SV: 84, 85, 89
−SW: 85, 86, 87, 92

Figure 9:
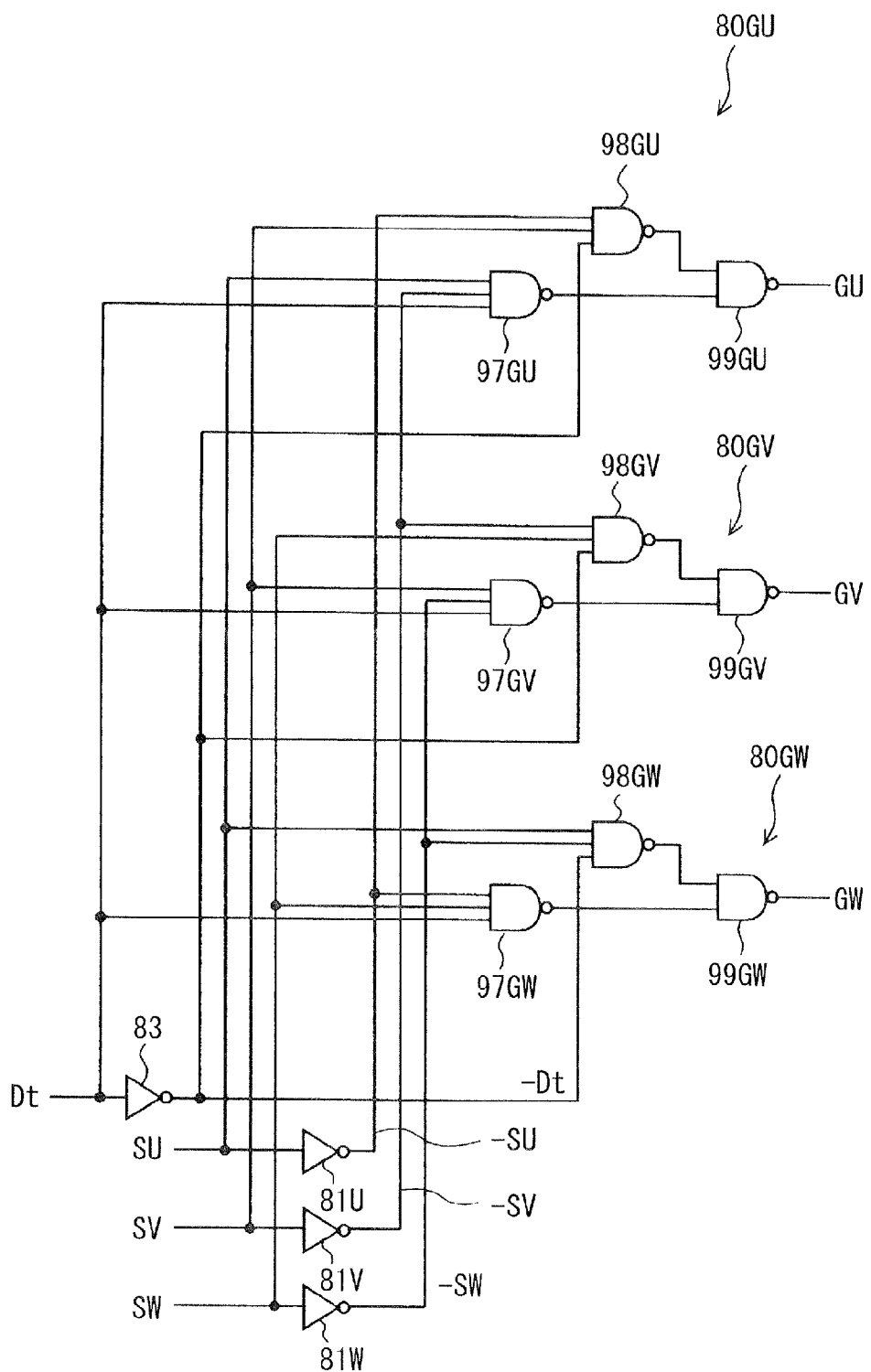
FIG. 9 is a circuit diagram (part 4), which corresponds to FIG. 6.

FIG. 9 shows logic parts 80GU, 80GV and 80GW, which generate drive signals GU, GV and GW, respectively. Each part has three NAND gates 97 to 99. The output terminals of the NAND gates 97 and 98 are connected to the input terminals of the NAND gate 99, respectively. NAND gates 99GU, 99GV and 99GW output drive signals GU, GV and GW from respective output terminals. In the logic part 80GU, the sensor signal SU, the sensor signal SV, the sensor signal −SU and the sensor signal −SV are applied to an input terminal of a NAND gate 97GU, an input terminal of a NAND gate 98GU, an input terminal of a NAND gate 98GU and an input terminal of a NAND gate 97GU, respectively. In the logic part 80GV, the sensor signal SV, the sensor signal SW, the sensor signal −SV and the sensor signal −SW are applied to an input terminal of a NAND gate 97GV, an input terminal of a NAND gate 98GV, an input terminal of a NAND gate 98GV and an input terminal of a NAND gate 97GV, respectively.

In the logic part 80GW, the sensor signal SU, the sensor signal SW, the sensor signal −SU and the sensor signal −SW are applied to an input terminal of a NAND gate 98GW, an input terminal of a NAND gate 97GW, an input terminal of a NAND gate 97GW and an input terminal of a NAND gate 98GW, respectively. The target rotation direction Dt is applied to the input terminal of the NAND gate 97. The output terminal of the NOT gate 83 is applied to the input terminal of the NAND gate 98. The energization control logic circuit 80, which is constructed as described above, outputs the drive signals FU to FV and GU to GV, which are 120-degree energization pattern, when the target rotation direction Dt and the actual rotation direction Da agree. The energization control logic circuit 80 further outputs the drive signals FU to FV and GU to GV, which are 180-degree energization pattern, when the target rotation direction Dt and the actual rotation direction Da do not agree.

Figure 10:
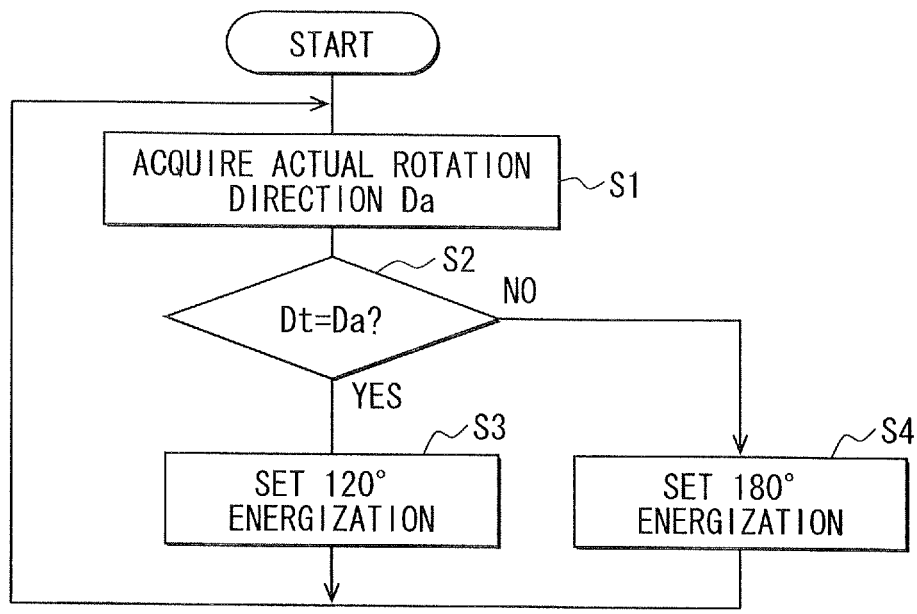
FIG. 10 is a flowchart showing control processing performed in the embodiment.

Operation of the embodiment is described with reference to FIG. 10 to FIG. 13. FIG. 10 is a flowchart showing control details of the main part of the embodiment performed by the control circuit 60. The control circuit 60 acquires at step S1 the actual rotation direction Da supplied from the signal generation circuit 72 and compares at step S2 the actual rotation direction Da and the target rotation direction Dt, which is outputted from the outside to the energization circuit 74. If both directions agree (YES), that is, Dt=Da, the energization control logic in the energization circuit 74 is set to a 120-degree energization at step S3. If the directions do not agree (NO) at step S2, the energization control logic in the energization circuit 74 is switched over to a 180-degree energization at step S4 from the 120-degree energization.

Figure 11A:
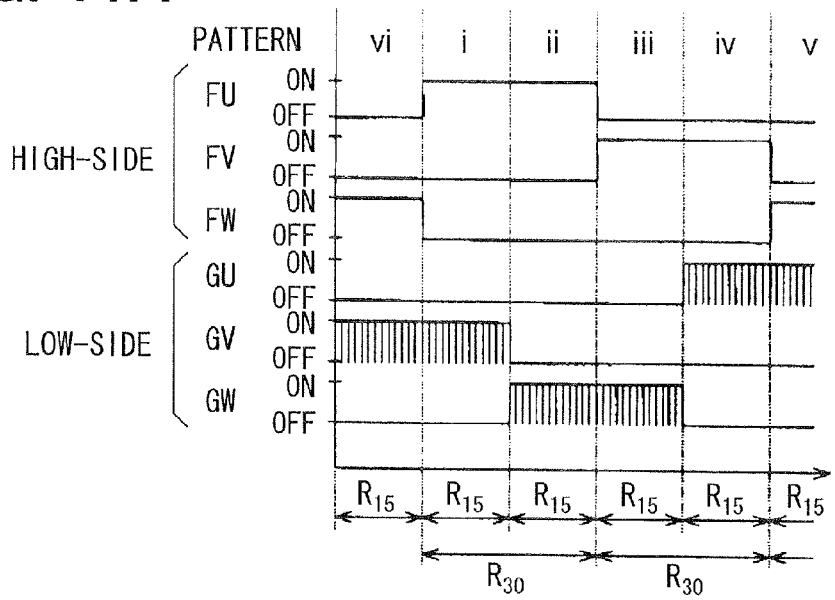
FIGS. 11A, 11B and 11C are timing diagrams showing switching of energization patterns performed in the embodiment.
Figure 11B:
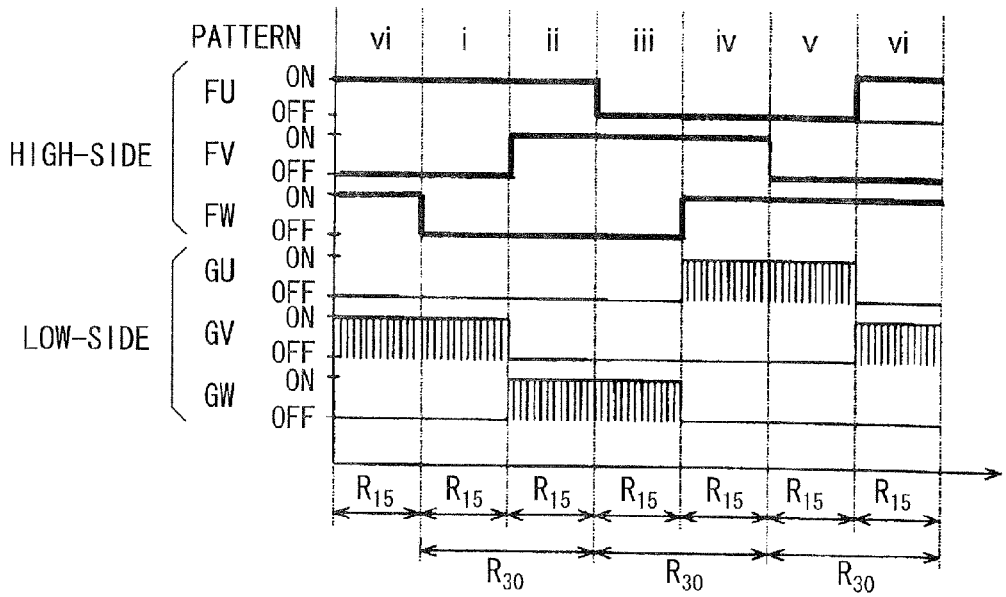

When the 180-degree energization is performed at step S4, the period, in which the high-side switching elements FU, FV and FW are turned on is extended by an amount of mechanical angle of 15 degrees to the advanced phase side, that is, to the left side in the energization pattern (forward rotation torque command case) shown in FIG. 11A. Specifically, as shown in FIG. 11B, in each of phases U, V and W, the high-side (H) switching elements are started to turn on in the patterns vi, ii and iv. Since the motor 4 has 8 poles, the electric angle of 60 degrees correspond to mechanical angle of 15 degrees. As a result, the switching pattern is switched over from the pattern of FIG. 10A to the pattern of FIG. 10B. In case that a reverse torque command for the motor 4 is applied from the external side, the energization pattern is switched as shown in FIG. 5B. In each of phases U, V and W, the high-side switching elements are turned on in the patterns iv, vi and ii.

Figure 15:
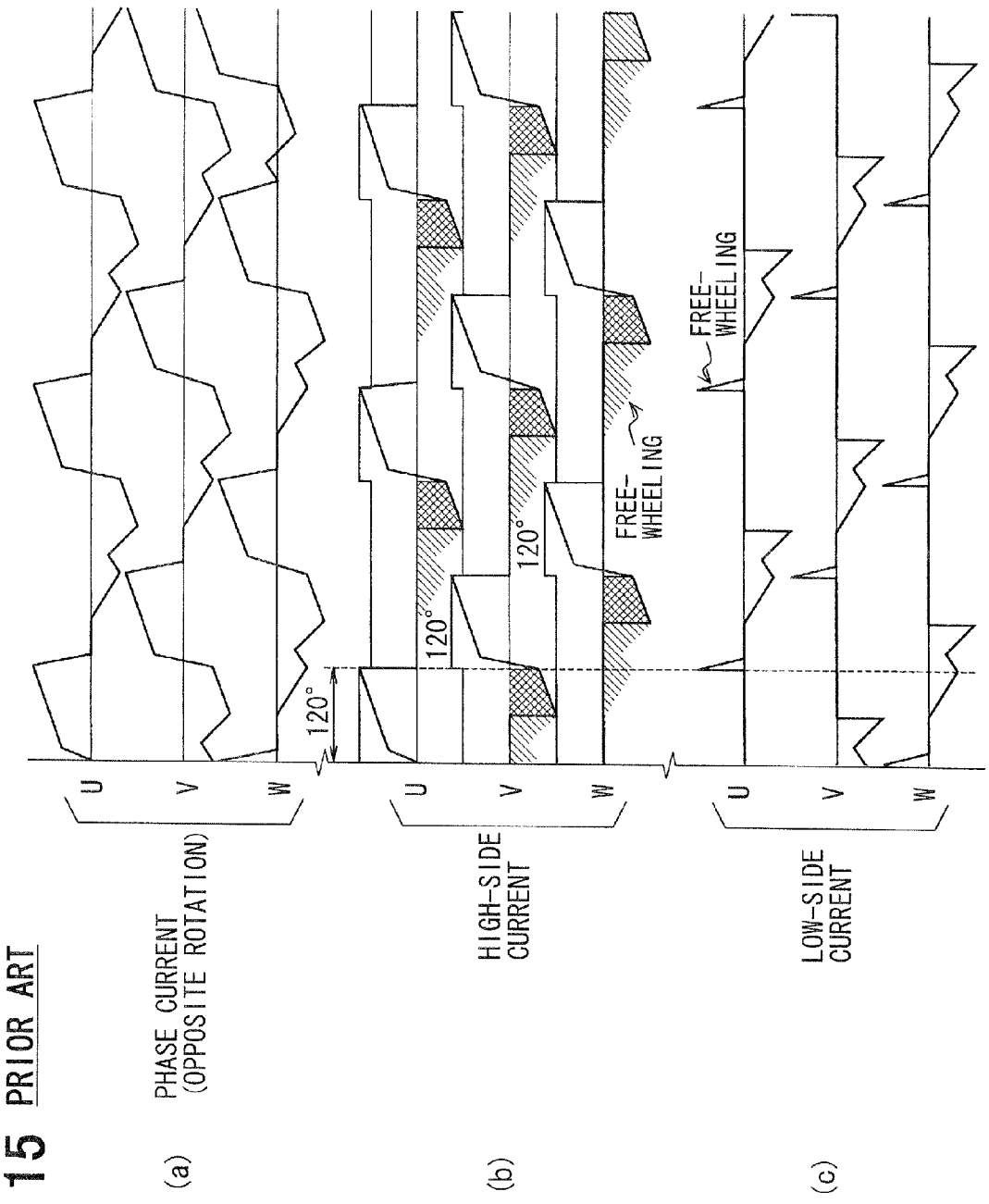
FIG. 15 is a timing diagram showing a case that a target rotation direction and an actual rotation direction of a motor are different according to the prior art.

FIG. 11 shows a pattern, which corresponds to that shown in (b) of FIG. 15. Since the pattern changes from the 120-degree energization to the 180-degree energization, the free-wheeling current flows through the high-side switching elements FU, FV and FW, which are turned on during the energization period. According to the conventional example, the free-wheeling current flows through free-wheeling diodes Dfu, Dfv and Dfw of the high-side switching elements FU, FV and FW. That is, the high-side switching elements FU, FV and FW are turned on in correspondence to the period, in which the free-wheeling current flows caused by the induced voltage as shown by cross-hatching.

Figure 13:
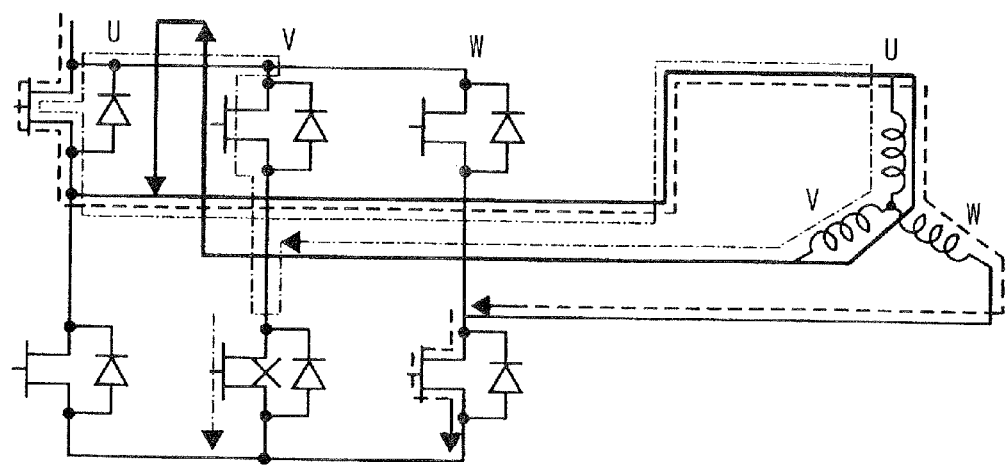
FIG. 13 is a circuit diagram showing a free-wheeling current flow path when an energization method is switched to 180-degree energization.
Figure 14:
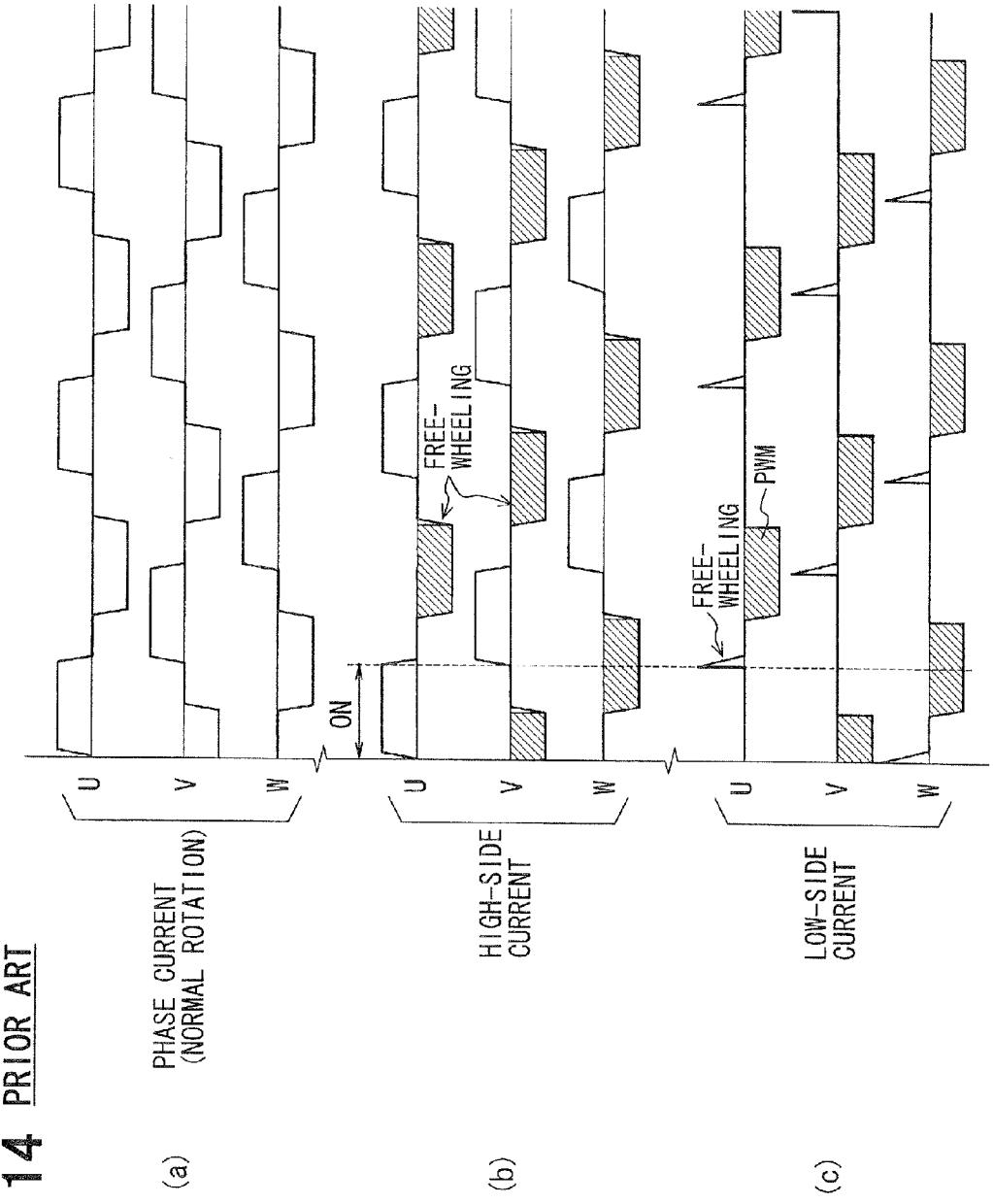
FIG. 14 is a timing diagram showing 120-degree energization pattern according to a prior art.
Figure 16:
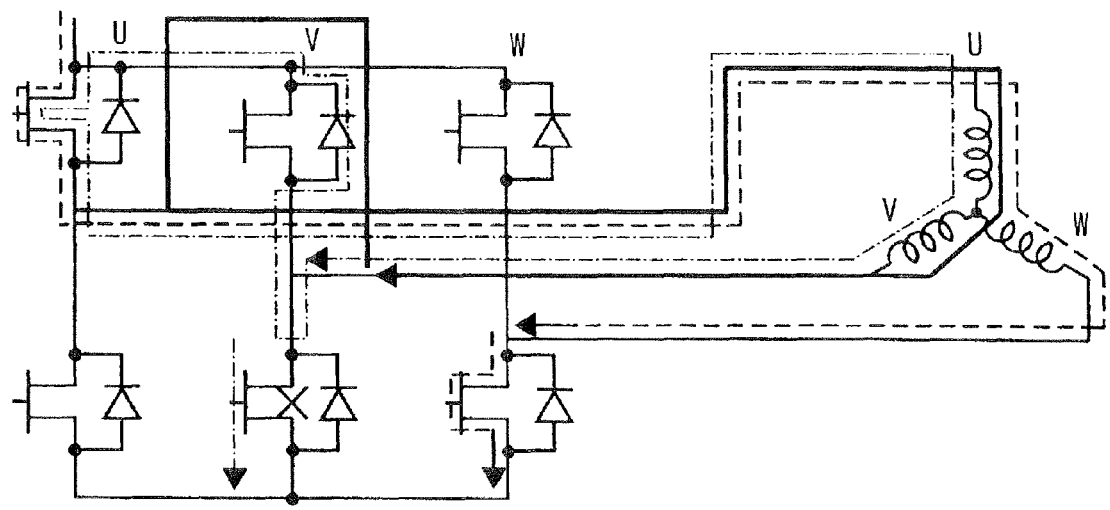
FIG. 16 is a circuit diagram showing free-wheeling current flow path according to the prior art.

FIG. 13 corresponds to FIG. 16. When the V-phase low-side switching element GV is switching-driven by the PWM signal, that is, turned on and off alternately, while the U-phase high-side switching element FU is in the turned-on state, the V-phase high-side switching element FV is turned on during a period, in which the V-phase low-side switching element GV is turned off from the turned-on state. In this case, the free-wheeling current does not flow through the free-wheeling diode current but flows through the V-phase high-side switching element FV as shown by the one-dot chain line in FIG. 13. This is different from the conventional case shown in FIG. 16, in which the free-wheeling current indicated by the one-dot chain line flows through the free-wheeling diode of the high-side switching element FV.

Figure 11C:
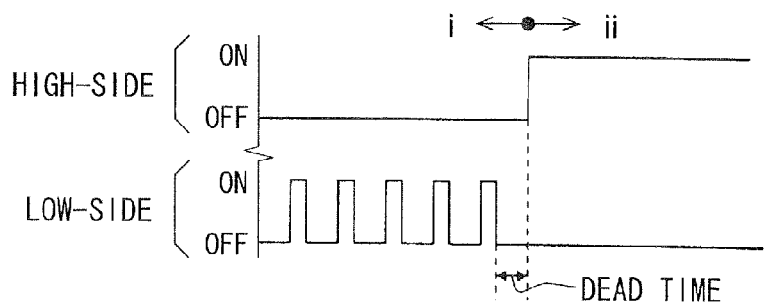
Figure 12:
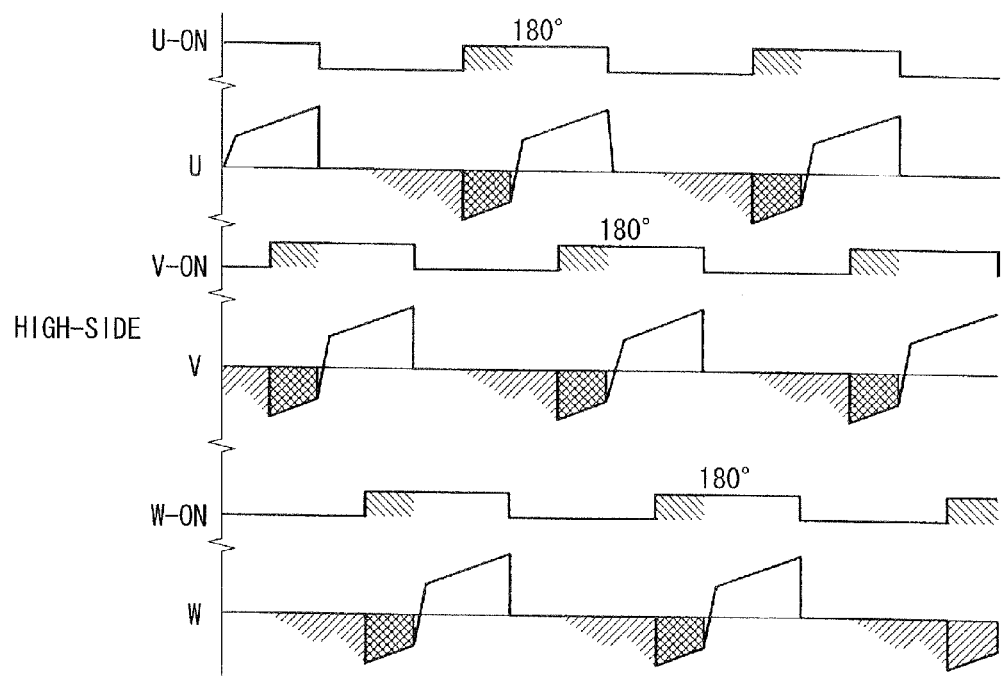
FIG. 12 is a timing diagram showing currents, which flow in high-side switching elements of an inverter when 180-degree energization is performed.

When the 180-degree energization is performed as shown in FIG. 11B, the pattern is switched over from the pattern i, in which the V-phase low-side switching element GV is switching-driven by the PWM signal, to the pattern ii, in which the V-phase high-side switching element FV is turned on. The energization drive circuit 78 therefore sets the output timing of the PWM signal to provide a dead time, in which the V-phase low-side switching element is turned off at the same time as the V-phase high-side switching element FV is turned off, by turning off the V-phase low-side switching element GV at the timing, at which the pattern i is switched to the pattern ii as shown in FIG. 11C. Thus, it is surely prevented that the high-side switching element and the low-side switching element are turned on at the same time to allow flow of a through current. The dead time is provided similarly in case of reverse rotation.

As described above, according to the present embodiment, the control circuit 60 controls the on-period of the high-side switching elements FU, FV and FW forming the inverter circuit 76 to extend to the advance phase side upon detection of a direction disagreement condition, in which the target rotation direction Dt of the motor 4 supplied as a command from the external side differs from the actual rotation direction Da of the motor 4 detected by the signal generation circuit 72 based on the sensor signals outputted from the rotation angle sensors SU, SV and Sw. Thus, the loss, which was conventionally caused by allowing the free-wheeling current to flow in the free-wheeling diode (FIG. 16), is reduced.

Specifically, the control circuit 60 PWM-controls the inverter circuit 76 by the 120-degree energization and the 180-degree energization under conditions that the target rotation direction Dt and the actual rotation direction Da are in agreement and not in agreement, respectively. With this configuration, it is possible to extend the on-period of the high-side switching element FU, FV and FW by switching over between the 120-degree energization method (mode), by which the energization pattern can be easily generated by detecting the rotational position of the rotor, and the 180-degree energization method (mode).

When the energization drive circuit 78 PWM-controls the inverter circuit 76 by the 180-degree energization, it provides the dead time so that, when the on-period of the high-side switching elements FU, FV and FW is started, the on-period overlaps the off-period of the low-side switching elements GU, GV and GW of the same phase. As a result, overlapping of the on-periods between the high-side and the low-side switching elements of the same phase is surely prevented. Since the switching elements FU to FW and GU to GW are formed of MOSFETs, the parasitic diodes can be used as the free-wheeling diodes. Further, since the on-resistance of a MOSFET is small, the loss caused when the high-side switching elements FU to FW are turned on can be reduced.

In addition, the rotation direction sensor is formed of three position sensors SU, SV and SW, which detect the rotor position of the motor 4, and the signal generation circuit 72, the control circuit 60 performs the PWM-control based on the position detection signals SU, SV and SW, and determines the actual rotation direction Da of the motor 4 based on a change in the output patterns. In case that the position sensors SU, SV and SW are used to perform the PWM control, the actual rotation direction Da can be determined by using the position detection signals outputted by the position sensors.

The energization control unit 6 PWM-controls the motor 4 by way of the inverter circuit 76. As a result, the camshaft 2 is driven to rotate in accordance with torque transmitted to the rotary shaft 14 of the motor 4. The phase regulating mechanism 8 regulates the relative phase between the crankshaft and the camshaft 2. When a vehicle is in travel, the target rotation direction Dt and the actual rotation direction Da of the motor 4, which forms the valve timing regulating apparatus 1 for the internal combustion engine, frequently become different from each other. However, by the energization control unit 6, the loss caused in the inverter circuit 76 can be reduced very effectively.

The present invention is not limited to the embodiment, which is described above and shown in the figures, but may be modified as follows. When the target rotation direction Dt and the actual rotation direction Da become different, it is not always necessary to switch from the 120-degree energization to the 180-degree energization. It is possible to control the on-timing of the high-side switching element to shift to the advance-side. If it is not likely that the through current flows even if not dead time is provided, or that a small through current does not cause any problem, the dead time need not be provided. The rotation direction sensor is not limited to a combination of a plurality of position sensors. It may be a rotation direction sensor, which is independent.

The switching elements are not limited to the MOSFET but may be a power transistor and an IGBT. The motor may be a type (SPM type, in which magnets are arranged on the surface side of the rotor. In this instance, the rotation position sensor need not have a sensor magnet. It is only necessary to detect magnetic force of the rotor magnet. The motor control apparatus is not limited to the valve timing regulating apparatus but may be applied to any control systems, in which, the target rotation direction and the actual rotation direction are different from each other.

What is claimed is:
1. A motor control apparatus comprising:
a rotation direction sensor that detects a rotation direction of a motor;
an inverter circuit that is formed of switching elements having respective free-wheeling diodes and connected in multi-phase bridges to energize coils of the motor; and a control circuit that controls the switching elements forming the inverter circuit by PWM-control, which performs pulse-width modulation, based on a target rotation direction supplied from an external side as a command, wherein the control circuit extends on-periods of high-side switching elements forming the inverter circuit to an advance phase side, when a direction disagreement condition, in which the target rotation direction and an actual rotation direction of the motor detected by the rotation detection sensor are in disagreement, is detected, the control circuit PWM-controls the inverter circuit by 120-degree energization, when a direction agreement condition, in which the target rotation direction and the actual rotation direction are in agreement, is detected; and the control circuit PWM-controls the inverter circuit by 180-degree energization, when the direction disagreement condition is detected.

2. The motor control apparatus according to claim 1, wherein:

the control circuit sets a dead time, in PWM-controlling the inverter circuit by the 180-degree energization, so that an off-period of the low-side switching element and an on-period of the high-side switching element in a same phase overlap.

3. The motor control apparatus according to claim 1, wherein:

the switching element is a MOSFET.

4. A motor control apparatus comprising:

a rotation direction sensor that detects a rotation direction of a motor;

an inverter circuit that is formed of switching elements having respective free-wheeling diodes and connected in multi-phase bridges to energize coils of the motor; and a control circuit that controls the switching elements forming the inverter circuit by PWM-control, which performs pulse-width modulation, based on a target rotation direction supplied from an external side as a command, wherein the control circuit extends on-periods of high-side switching elements forming the inverter circuit to an advance phase side, when a direction disagreement condition, in which the target rotation direction and an actual rotation direction of the motor detected by the rotation detection sensor are in disagreement, is detected, the rotation direction sensor is formed of a plurality of position sensors, which detect rotor positions of the motor; and the control circuit performs the PWM-control based on position detection signals outputted from the plurality of position sensors and determines the actual rotation direction of the motor based on changes in output patterns indicated by the position detection signals.

5. A valve timing regulating apparatus for regulating valve timing of at least one of a suction valve and an exhaust valve, which are opened and closed by a camshaft driven by torque of a crankshaft, the valve timing regulating apparatus comprising:

a motor that has a rotary shaft rotatable to generate output torque when energized;

a phase regulating mechanism that regulates a relative phase between the crankshaft and the camshaft by driving to rotate the camshaft in accordance with the torque of the rotary shaft; and a motor control apparatus comprising:

a rotation direction sensor that detects a rotation direction of a motor;

an inverter circuit that is formed of switching elements having respective free-wheeling diodes and connected in multi-phase bridges to energize coils of the motor; and a control circuit that controls the switching elements forming the inverter circuit by PWM-control, which performs pulse-width modulation, based on a target rotation direction supplied from an external side as a command, wherein the control circuit extends on-periods of high-side switching elements forming the inverter circuit to an advance phase side, when a direction disagreement condition, in which the target rotation direction and an actual rotation direction of the motor detected by the rotation detection sensor are in disagreement, is detected.

6. An energization method for energizing coils of a motor through an inverter circuit that is formed of multi-phase bridges, each phase including a high-side switching element and a low-side switching element having respective free-wheeling diodes, the energization method comprising:

PWM-controlling the switching elements forming the inverter circuit by pulse-width modulation based on a target rotation direction supplied from an external side as a command; and extending an on-period of the high-side switching element to an advance phase side, when a direction disagreement condition, in which the target rotation direction and an actual rotation direction of the motor detected by the rotation detection sensor are in disagreement, is detected, wherein the PWM-controlling controls the inverter circuit by 120-degree energization, when a direction agreement condition, in which the target rotation direction and the actual rotation direction are in agreement, is detected; and the PWM-controlling controls the inverter circuit by 180-degree energization, when the direction disagreement condition is detected.

7. The energization method according to claim 6, further comprising:

setting a dead time, in PWM-controlling the inverter circuit by the 180-degree energization, so that the low-side switching element is in an off-period when the on-period of the high-side switching element of a same phase starts.

8. An energization method for energizing coils of a motor through an inverter circuit that is formed of multi-phase bridges, each phase including a high-side switching element and a low-side switching element having respective free-wheeling diodes, the energization method comprising:

PWM-controlling the switching elements forming the inverter circuit by pulse-width modulation based on a target rotation direction supplied from an external side as a command; and extending an on-period of the high-side switching element to an advance phase side, when a direction disagreement condition, in which the target rotation direction and an actual rotation direction of the motor detected by the rotation detection sensor are in disagreement, is detected, wherein
the PWM-controlling controls the inverter circuit based on position detection signals outputted from a plurality of position sensors, which detect rotor positions of the motor; and
the PWM-controlling determines the actual rotation direction of the motor based on changes in output patterns indicated by the position detection signals.

\* \* \* \* \*